United States Patent
Choi et al.

(10) Patent No.: US 10,180,857 B2
(45) Date of Patent: Jan. 15, 2019

(54) MOBILE TERMINAL AND METHOD OF DETERMINING AND DISPLAYING POWER EFFICIENCY OF AN APPLICATION

(71) Applicant: SAMSUNG ELECTRONICS CO., LTD., Suwon-si (KR)

(72) Inventors: Jong-bum Choi, Yongin-si (KR); Hyung-hoon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/298,460

(22) Filed: Jun. 6, 2014

(65) Prior Publication Data

US 2015/0026487 A1    Jan. 22, 2015

(30) Foreign Application Priority Data

Jul. 19, 2013  (KR) .......................... 10-2013-0085686

(51) Int. Cl.
  *G06F 1/32*  (2006.01)
  *G06F 9/48*  (2006.01)

(52) U.S. Cl.
  CPC ............ *G06F 9/4893* (2013.01); *Y02D 10/24* (2018.01)

(58) Field of Classification Search
  CPC ........................................................ G06F 1/32
  USPC ....... 713/300, 310, 320, 321, 322, 323, 324, 713/340, 375
  See application file for complete search history.

(56) References Cited

U.S. PATENT DOCUMENTS

| | | | |
|---|---|---|---|
| 8,452,352 B2 * | 5/2013 | Kothari | H04W 52/0261 |
| | | | 455/127.5 |
| 8,667,089 B2 | 3/2014 | Cho et al. | |
| 8,862,910 B2 | 10/2014 | Sato | |
| 8,935,552 B2 | 1/2015 | Noro | |

(Continued)

FOREIGN PATENT DOCUMENTS

| | | | |
|---|---|---|---|
| JP | 2003-304319 A | 10/2003 | |
| JP | 2010-237931 A | 10/2010 | |

(Continued)

OTHER PUBLICATIONS

Communication dated Sep. 20, 2014 issued b the Korean Intellectual Property Office in counterpart Korean Application No. 10-2013-0085686.

(Continued)

*Primary Examiner* — Jaweed A Abbaszadeh
*Assistant Examiner* — Keshab R Pandey
(74) *Attorney, Agent, or Firm* — Sughrue Mion, PLLC

(57) ABSTRACT

A method and mobile terminal for determining a power efficiency of an application installed in and executed by a mobile terminal. The method includes: determining power consumption per unit time according to units of the installed and executed application; and determining a power efficiency level of the installed and executed application based on the determined power consumption per unit time. The mobile terminal includes: a power consumption determiner configured to determine power consumption per unit time according to units of the installed and executed application; and a level determiner configured to determine a power efficiency level of the installed and executed application based on the determined power consumption per unit time.

21 Claims, 19 Drawing Sheets

(56) References Cited

U.S. PATENT DOCUMENTS

| | | | |
|---|---|---|---|
| 9,148,032 B1* | 9/2015 | Frost | H02J 7/007 |
| 9,189,216 B2 | 11/2015 | Yamamoto | |
| 9,977,576 B2 | 5/2018 | Kim et al. | |
| 2005/0177327 A1 | 8/2005 | Banginwar et al. | |
| 2008/0057894 A1* | 3/2008 | Aleksic | H02J 9/002 455/187.1 |
| 2009/0164152 A1* | 6/2009 | Creus | G06F 1/3203 702/63 |
| 2010/0005326 A1* | 1/2010 | Archer | G06F 1/32 713/320 |
| 2010/0145643 A1 | 6/2010 | Katpelly et al. | |
| 2011/0040990 A1* | 2/2011 | Chan | G06F 1/28 713/300 |
| 2011/0066871 A1* | 3/2011 | Farmer | G06F 1/263 713/340 |
| 2011/0072378 A1 | 3/2011 | Nurminen et al. | |
| 2012/0134517 A1* | 5/2012 | Sato | H04M 1/72522 381/150 |
| 2012/0210325 A1 | 8/2012 | de Lind van Wijngaarden et al. | |
| 2013/0054044 A1 | 2/2013 | Shaffer et al. | |
| 2013/0067263 A1* | 3/2013 | Liu | H04W 52/0225 713/340 |
| 2013/0138989 A1 | 5/2013 | Jang et al. | |
| 2013/0144456 A1* | 6/2013 | Cheng | G06F 1/3287 700/298 |
| 2013/0305087 A1* | 11/2013 | Catthoor | G06F 11/14 714/15 |
| 2014/0173319 A1* | 6/2014 | Zeng | G06F 11/3013 713/340 |

FOREIGN PATENT DOCUMENTS

| | | |
|---|---|---|
| JP | 2012-63917 A | 3/2012 |
| JP | 2012-190447 A | 10/2012 |
| JP | 2013-45373 A | 3/2013 |
| JP | 2013-109442 A | 6/2013 |
| KR | 10-2010-0038969 A | 4/2010 |
| KR | 10-2010-0092977 A | 8/2010 |
| KR | 10-2010-0126025 A | 12/2010 |
| KR | 10-2011-0049507 A | 5/2011 |
| KR | 10-2013-0006555 A | 1/2013 |
| WO | 2011/155106 A1 | 12/2011 |

OTHER PUBLICATIONS

Communication dated Oct. 31, 2014 issued by the International Searching Authority in counterpart International Application No. PCT/KR2014/006201 (PCT/ISA/210 & 237).
Communication dated Nov. 15, 2016, from the Japanese Patent Office in counterpart application No. 2016-527914.
Communication dated Feb. 28, 2017, issued by the European Patent Office in counterpart European Application No. 14825609.2.
Communication dated Mar. 14, 2017, issued by the Japanese Patent Office in counterpart Japanese Application No. 2016-527914.
Communication dated Aug. 29, 2017, issued by the Japanese Patent Office in counterpart Japanese application No. 2016-527914.

* cited by examiner

MOBILE TERMINAL AND METHOD OF DETERMINING AND DISPLAYING POWER EFFICIENCY OF AN APPLICATION

RELATED APPLICATIONS

This application claims the benefit of Korean Patent Application No. 10-2013-0085686, filed on Jul. 19, 2013, in the Korean Intellectual Property Office, the disclosure of which is incorporated herein by reference, in its entirety.

BACKGROUND

1. Technical Field

One or more exemplary embodiments relate to a method and mobile terminal for determining and displaying a power efficiency of an application.

2. Description of the Related Art

Recently, the performance of widely supplied portable mobile terminals, such as smartphones and tablet personal computers (PCs), has increased. Thus, various types of applications are installable in the mobile terminals.

However, the capacities of batteries have not increased, compared to the increased performance of the mobile terminals. Thus, power consumed while executing an application installed in the mobile terminals largely affects the usage time of the mobile terminals. In other words, in response to the number of applications executed in the mobile terminals increasing, power consumption is increased.

Accordingly, in order to increase the use time of the mobile terminals, an application consuming low power may be selectively used.

SUMMARY

According to one or more exemplary embodiments, a method of determining power efficiency of an application installed in and executed by a mobile terminal, the method includes: determining power consumption per unit time according to units of the application; and determining a power efficiency level of the application based on the determined power consumption per unit time.

The determining of the power consumption may include determining power consumption of units including at least one of a central processing unit (CPU), a graphics processing unit (GPU), a display, a sensor, a communicator, a camera, and other units, based on the power consumption per unit time according to the devices.

The determining of the power efficiency level may include determining the power efficiency level by referring to a predetermined level determining table.

The predetermined level determining table may be set differently according to specifications of mobile terminals.

The method may be performed by the mobile terminal.

The determining of the power consumption may include: collecting a usage pattern of a user of the mobile terminal; and determining the power consumption per unit time according to the units by referring to the collected usage pattern.

The method may be performed by an applications server.

The determining of the power consumption may include: setting a scenario to be performed by the application; and determining the power consumption per unit time by referring to a result of the application performing the set scenario.

The method may further include determining whether a power efficiency level of the application exists.

The determining of whether the power efficiency level exists may include receiving information related to a power efficiency level from an applications server.

The determining of whether the power efficiency level exists may include reading information related to a power efficiency level from application data installed in the mobile terminal.

According to one or more exemplary embodiments, a method of displaying power efficiency of an application installed in and executed by a mobile terminal includes: determining a power efficiency level of the application installed in the mobile terminal; and displaying the determined power efficiency level on the mobile terminal.

The determining of the power efficiency level may include determining power consumption per unit time according to units of the application.

The displaying may include displaying the determined power efficiency level in a list on a display screen of applications installed in the mobile terminal.

The displaying may include displaying battery consumption of the application and the power efficiency level of the application on a battery consumption display screen of the mobile terminal.

The displaying may include displaying the power efficiency level on a screen for editing or deleting the application installed in the mobile terminal.

The displaying may include displaying the power efficiency level on a state display region in response to the application being executed by the mobile terminal.

The displaying may include displaying the power efficiency level in a list on a display screen of applications provided by an applications server.

The displaying may include, in response to a certain application being selected from an applications server based on a user selection, displaying an associated application related to the certain application and a power efficiency level of the associated application.

The displaying of the associated application may include displaying, based on priority, an associated application having a high power efficiency level.

According to one or more exemplary embodiments, a method of controlling power of a mobile terminal in and by which an application is installed and executed includes: determining a power efficiency level of the application; determining whether remaining battery life of the mobile terminal in which the application is installed is less than or equal to a predetermined value; and prohibiting an application whose power efficiency level is less than or equal to the predetermined level from being executed based on a result of determining the remaining battery life.

The determining of the power efficiency level may include determining power consumption per unit time according to units of the application.

The prohibiting may include maintaining an application necessary for a system operation or an application preset by a user to be executable.

The method may further include terminating an application whose power efficiency level is less than or equal to the predetermined level from among applications executed by the mobile terminal, based on the result of determining the remaining battery life.

The terminating of the application may include displaying a popup window for selecting whether to terminate the application whose power efficiency level is less than or equal to the predetermined level to a user of the mobile terminal.

The method may further include: storing a termination history in response to the application whose power efficiency level being less than or equal to the predetermined level; and re-executing the terminated application based on the termination history in response to the remaining battery life of the mobile terminal being equal to or higher than the predetermined value.

According to one or more exemplary embodiments, a mobile terminal for determining a power efficiency of an application installed in and executed by the mobile terminal, the mobile terminal includes: a power consumption determiner configured to determine power consumption per unit time according to units of the application; and a level determiner configured to determine a power efficiency level of the application based on the determined power consumption per unit time.

According to one or more exemplary embodiments, an applications server for determining a power efficiency of an application installed in and executed by a mobile terminal includes: a power consumption determiner configured to determine power consumption per unit time according to units of the application; and a level determiner configured to determine a power efficiency level of the application based on the determined power consumption per unit time.

According to one or more exemplary embodiments, a mobile terminal for displaying a power efficiency of an application installed in and executed by the mobile terminal includes: a power efficiency analyzer including a power consumption determiner configured to determine power consumption per unit time according to units of the application, and a level determiner configured to determine a power efficiency level of the application based on the determined power consumption per unit time; and a controller configured to display the determined power efficiency level on the mobile terminal.

The controller may include a determiner configured to determine whether remaining battery life of the mobile terminal in which the application is installed is less than or equal to a predetermined value, and configured to prohibit an application whose power efficiency level is less than or equal to a predetermined level from being executed based on a result of the determination of the determiner.

An aspect of an exemplary embodiment may provide a mobile terminal for displaying a power efficiency of an application installed in and executed by the mobile terminal, the mobile terminal including: a power efficiency analyzer comprising a power consumption determiner configured to determine power consumption per unit time according to units of the installed and executed application, a level determiner configured to determine a power efficiency level of the installed and executed application based on the determined power consumption per unit time, and a level determining table for matching power consumption and power efficiency levels; and a controller comprising a determiner configured to determine whether remaining battery life of the mobile terminal in which the application is installed and executed is less than or equal to a predetermined value configured to display the determined power efficiency level on the mobile terminal.

The controller may be configured to prohibit an installed and executed application whose power efficiency level is less than or equal to a predetermined level from being executed based on a determination result of the determiner.

According to one or more exemplary embodiments, a computer-readable recording medium has recorded thereon a program for executing the method.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
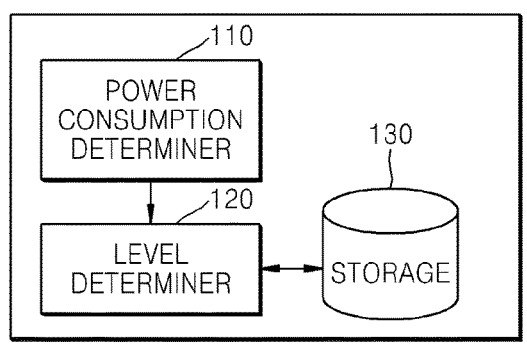
FIG. 1A is a block diagram of a mobile terminal according to an exemplary embodiment.

Hereinafter, one or more exemplary embodiments will be described in detail. In the following description, terms such as "unit" and "module" indicate a unit for processing at least one function or operation, wherein the unit and the block may be embodied as hardware or software or embodied by combining hardware and software.

A mobile terminal according to an exemplary embodiment may have any form. Examples of the mobile terminal described herein include a mobile phone, a smartphone, a laptop, a tablet personal computer (PC), an electric book terminal, a digital broadcasting terminal, a personal digital assistant (PDA), a portable multimedia player (PMP), and a navigation system, but are not limited thereto.

Methods and mobile terminals for determining and displaying a power efficiency of an application, according to exemplary embodiments, will now be described in detail with reference to accompanying drawings. In this regard, the exemplary embodiments may have different forms and should not be construed as being limited to the descriptions set forth herein. Also, while describing the exemplary embodiments, detailed descriptions about related well-known functions or configurations that may diminish the clarity of the points of the exemplary embodiments are omitted. In the drawings, like reference numerals refer to like elements throughout. Expressions such as "at least one of," when preceding a list of elements, modify the entire list of elements and do not modify the individual elements of the list.

FIG. 1A is a block diagram of a mobile terminal 100 according to an exemplary embodiment. Though only components of the mobile terminal 100 that are related to the exemplary embodiments are shown in FIG. 1, the mobile terminal 100 may further include general-purpose components other than those shown in FIG. 1A.

Referring to FIG. 1A, the mobile terminal 100 includes a power consumption determiner 110, a level determiner 120, and a storage 130. According to an exemplary embodiment, the storage 130 may include a level determining table.

First, the power consumption determiner 110 may calculate power consumption according to units of an application installed in and executed by the mobile terminal 100. Also, the power consumption determiner 110 may calculate power consumption of an application per unit time, based on the power consumption according to units.

For example, power consumption per unit time according to units of an application may be calculated according to Equation 1 below.

Overall Power Consumption per Unit Time=(Power Consumption of central processing unit (CPU_/ Measurement Time)+(Power Consumption of graphics processing unit (GPU)/Measurement Time)+(Power Consumption of Display Unit/ Measurement Time)+(Power Consumption of Sensor Unit/Measurement Time)+(Power Consumption of Camera Unit/Measurement Time)+ (Power Consumption of Other Units/Measurement Time) [Equation 1]

In other words, in response to an application being executed, power consumption of units including at least one of a CPU, a GPU, a display, a sensor, a camera, and other units of the mobile terminal 100 may be calculated based on power consumption per unit time according to the units. Here, the sensor may include units for detecting a touch input, a position, illumination, geomagnetism, magnetism, altitude, and a temperature. The other units may include units consuming power as the application is executed by the mobile terminal 100, such as a speaker, an inter red (IR) module, and a memory.

Here, an amount of power consumed to provide a background service or an operating system (OS) is massive, aside from power consumed by an application to be measured, from among the power consumption according to units. Accordingly, the power consumption determiner 110 may calculate the power consumption according to units while considering a usage rate of the application to be measured. For example, the power consumption determiner 110 may calculate a ratio (%) of CPU used by the application in response to the application being executed, and measure power consumption of the CPU in response to the application being executed. A usage rate of the CPU by the application from the measured power consumption of the CPU may be calculated as power consumption per unit time of a corresponding unit. Power consumption of another unit in response to the application being executed may be calculated by measuring a usage rate and power consumption per unit time. In other words, current power consumption may be calculated based on power data measured in comparison with to a usage rate according to units.

Alternatively, the power consumption determiner 110 may calculate power consumption per unit time of the application, considering a usage pattern of the mobile terminal 100 by a user.

In particular, in response to the same application being used in the same mobile terminal 100, power consumption may differ in response to different usage patterns of users. Accordingly, the power consumption determiner 110 may collect usage patterns of users, and modify the measured power consumption according to the collected usage pattern.

For example, in response to a user using an application by increasing the brightness of a display to a maximum, the power consumption determiner 110 may use a value obtained by modifying, as a certain percentage from power consumption of the display, to determine overall power consumption of the application.

Alternatively, the user may determine power consumption according to a network environment. For example, the power consumption may be added or subtracted by a certain percentage based on whether the network environment is a mobile communication network, such as 3rd generation (3G) or 4G, or a wireless communication network, such as Wi-Fi.

However, an exemplary embodiment is not limited thereto, and power consumption of an application may be calculated by setting an addition or subtraction value according to using patterns of users for all units whose power consumption is changeable according to the usage patterns.

Alternatively, the power consumption determiner 110 may determine power consumption per unit time according to units by executing an application according to a predetermined scenario. Details regarding the power consumption determiner 110 determining the power consumption per unit time according to units, in response to an application performing a scenario will be described in detail below with reference to FIG. 3.

The power consumption per unit time calculated by the power consumption determiner 110 may vary according to the usage patterns and types of operations of the application. Accordingly, the power consumption of the application may be measured at least once and an average value thereof may be determined as the power consumption per unit time. Alternatively, a predetermined scenario may be set and the power consumption may be determined based on a result of performing the predetermined scenario by the application. An operation of measuring or calculating power consumption per unit time by setting a scenario will be described below with reference to FIG. 3.

The level determiner 120 may determine a power efficiency level of the application based on the determined power consumption per unit time. In particular, the level determiner 120 may determine the power efficiency level of the application which corresponds to a range of power consumption of the application calculated by the power consumption determiner 110 by referring to the level determining table stored in the storage 130.

For example, the level determining table may match power consumption and power efficiency levels as shown in Table 1 below. If the power consumption of the application is 250 mw/h, the power efficiency level is level 3.

TABLE 1

| Power Consumption | Power Efficiency Level |
| --- | --- |
| Equal to or less than 100 mw/h | Level 1 |
| Equal to or less than 200 mw/h | Level 2 |

TABLE 1-continued

| Power Consumption | Power Efficiency Level |
| --- | --- |
| Equal to or less than 300 mw/h | Level 3 |
| Equal to or less than 400 mw/h | Level 4 |
| More than 400 mw/h | Level 5 |

The level determining table may differ according to characteristics of mobile terminals, and may be amended and revised via an external data network or the results of a level determination. For example, an application may consume less power in a mobile terminal only using a low performance CPU than in a mobile terminal using a high performance CPU or GPU, and at this time, a range of power consumption for each power efficiency level may be decreased. Accordingly, a power efficiency level which corresponds to a range of the power consumption may be adaptively determined by a mobile terminal.

In Table 1, level 1 is highest and level 5 is lowest in terms of power efficiency level. Accordingly, a power efficiency level is high in response to power consumption being low, and a power efficiency level being low in response to power consumption being high.

It would be obvious to one of ordinary skill in the art that the number of power efficiency levels is not limited to 5, and may be at least two.

Figure 1B:
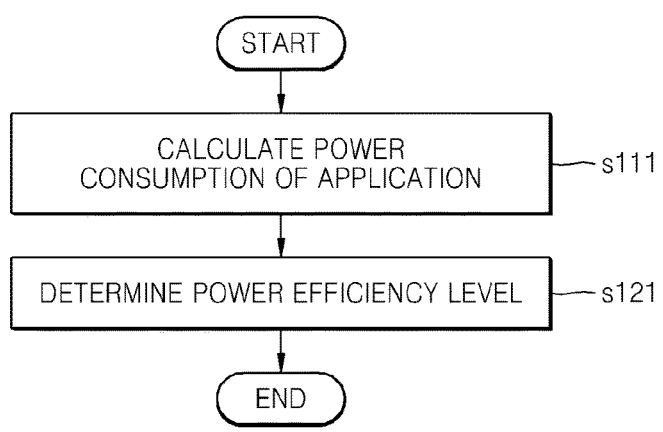
FIG. 1B is a flowchart of a method of determining a power efficiency of an application, according to an exemplary embodiment.

FIG. 1B is a flowchart of a method of determining a power efficiency of an application, according to an exemplary embodiment.

Referring to FIG. 1B, the method includes operations performed by the mobile terminal 100 of FIG. 1B in a time series. Accordingly, even if omitted, details of the mobile terminal 100, described above with reference to FIG. 1A, are applied to the method of FIG. 1B.

In operation S111, the power consumption determiner 110 may calculate power consumption of an application. In particular, the power consumption determiner 110 may measure power consumption per unit time of main hardware units forming the mobile terminal 100, while the application is executed. Alternatively, the power consumption determiner 110 may calculate current power consumption based on measured power data versus a usage rate according to units.

Operation S111 will now be described in detail with reference to FIG. 1C.

Figure 1C:
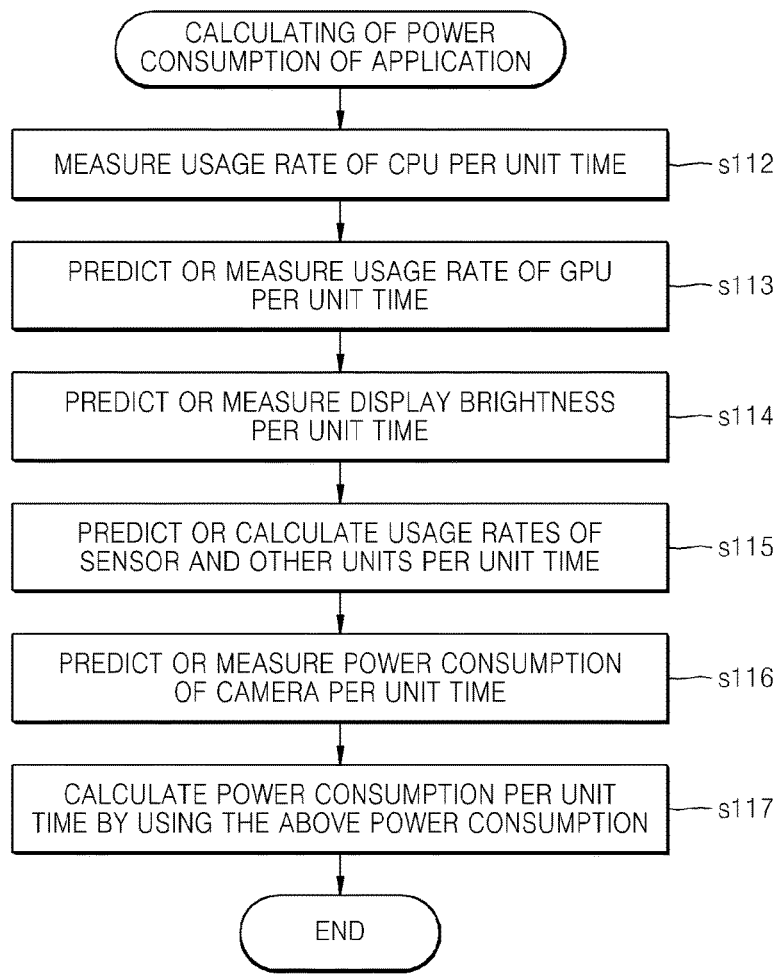
FIG. 1C is a flowchart of calculating of power consumption of an application of FIG. 1B, according to an exemplary embodiment.

FIG. 1C is a flowchart of calculating of power consumption of an application of FIG. 1B, according to an exemplary embodiment.

First, in operation S112, the power consumption determiner 110 may measure a usage rate of a CPU per unit time. In particular, a unit that supports multitasking, such as the CPU, may consume power not only to execute the application, but also to provide a background service or an operating system (OS). Accordingly, the power consumption of the CPU per unit time in response to the application being executed, may be calculated by measuring the usage rate of the CPU in response to the application being executed.

In operation S113, the power consumption determiner 110 may predict or measure a usage rate of a GPU per unit time. In particular, a determination may be made as to whether or not the GPU is used, according to specifications of the application, and in response to the GPU being used, the usage rate per unit time may be measured or power consumption of the GPU per unit time may be calculated, based on the usage rate.

In operation S114, the power consumption determiner 110 may predict or measure display brightness per unit time. In particular, a determination is made as to whether the display unit is used according to the specifications of the application in order to predict the display brightness. In response to the display being used, the display brightness may be predicted or measured in order to calculate power consumption of the display unit per unit time. In particular, the display brightness may be predicted by determining whether the display is used according to the specifications of the application. In response to the display is used, the display brightness may be predicted or measured in order to calculate power consumption of the display per unit time.

For example, the display brightness of an application that rarely uses a display, such as an alarm application, may be predicted to be 0. Also, in response to the display brightness being high when the application is executed, the power consumption of the application may be calculated to be high.

In operation S115, the power consumption determiner 110 may predict or calculate usage rates of the sensor and other units per unit time in response to the application being executed. In particular, the usage rates of the sensor and other units may be predicted by determining whether the sensor and other units are used according to the specifications of the application. In response to the sensor and other units being used, the usage rates may be calculated per unit time.

In operation S116, the power consumption determiner 110 may predict or measure power consumption of a camera per unit time in response to the application being executed. In particular, the power consumption determiner 110 may determine whether the camera is used in response to the application being executed according to the specifications of the application and predict a usage rate of the camera per unit time. In response to the camera being used, power consumption of the camera may be measured.

Lastly, in operation S117, the power consumption determiner 110 may determine the power consumption of the application per unit time by using the power consumption measured in operations S112 through S116.

Referring back to FIG. 1B, in operation S121, the level determiner 120 may determine a power efficiency level based on the determined power consumption. In particular, the power efficiency level of the application may be determined according to the range of the power consumption determined by the power consumption determiner 110 by referring to the level determining table.

The power efficiency level per unit time of the application executed by the mobile terminal 100 is determined as described above, so as to quantitatively determine the power consumption of the application.

Figure 1D:
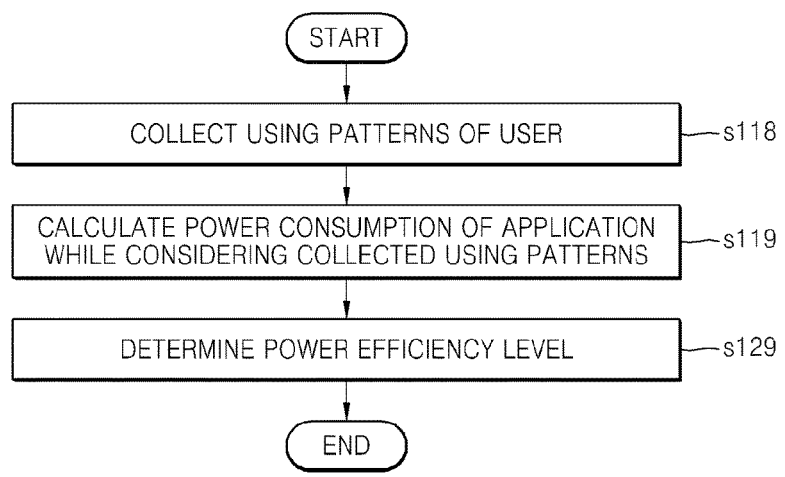
FIG. 1D is a flowchart of a method of determining power efficiency of an application, according to another exemplary embodiment.

FIG. 1D is a flowchart of a method of determining power efficiency of an application, according to another exemplary embodiment.

In operation S118, the mobile terminal 100 may collect usage patterns of a user. For example, information related to basic display brightness of a display set by the user and information related to a network environment of the user, i.e., whether the network environment is a mobile communication network, such as 3G or 4G, or a wireless communication network, such as Wi-Fi, may be collected.

In operation S119, the power consumption determiner 110 determines power consumption of an application while considering the collected usage patterns. For example, referring to FIG. 1C, the power consumption per unit time may be measured according to units by repeatedly performing operations S112 through S116. Alternatively, the power consumption determiner 110 may revise a certain percentage of the power consumption according to units by considering the collected usage patterns, and determine the overall power consumption of the application by using the revised power consumption according to units.

In operation S129, a power efficiency level of the application may be determined based on the determined power consumption of the application. Since details thereof are described above with reference to operation S121 of FIG. 1B, descriptions thereof are not repeated herein.

Figure 2:
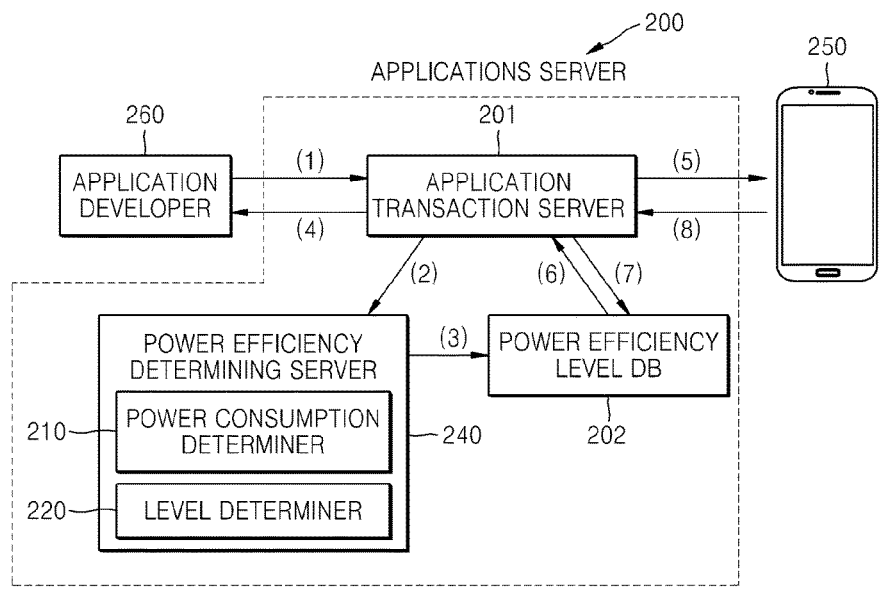
FIG. 2 is a block diagram of an applications server for determining a power efficiency of an application, according to an exemplary embodiment.

FIG. 2 is a block diagram of an applications server 200 for determining a power efficiency of an application, according to an exemplary embodiment.

Referring to FIG. 2, the applications server 200 may include an application transaction server 201, a power efficiency determining server 240, and a power efficiency level database (DB) 202.

The application transaction server 201 may register and store an application provided by an application developer 260. Also, the application transaction server 201 may provide a list of registered applications to a mobile terminal 250. In response to a user of the mobile terminal 250 providing a predetermined price, the application transaction server 201 may provide an application selected from the list to be downloaded to the mobile terminal 250. For example, the application transaction server 201 may provide an online market for freely buying and selling applications.

In response to an application developed by the application developer 260 being registered in the application transaction server 201, the application transaction server 201 transmits the application to the power efficiency determining server 240, and the power efficiency determining server 240 may determine a power efficiency level of the application received from the application transaction server 201.

The power efficiency determining server 240 may include a power consumption determiner 210 and a level determiner 220. In particular, the power consumption determiner 210 may calculate power consumption per unit time according to units of the application, and the level determiner 220 may determine the power efficiency level of the application based on the determined power consumption per unit time.

Alternatively, the power consumption determiner 210 may set a scenario to be performed by the application and may calculate power consumption per unit time based on a result of the application performing the scenario.

Then, in response to the power efficiency determining server 240 determining a power efficiency level of the application according to various scenarios, the determined power efficiency level is stored in the power efficiency level DB 202. A scenario for determining a power efficiency level of an application will now be described with reference to FIG. 3.

Figure 3:
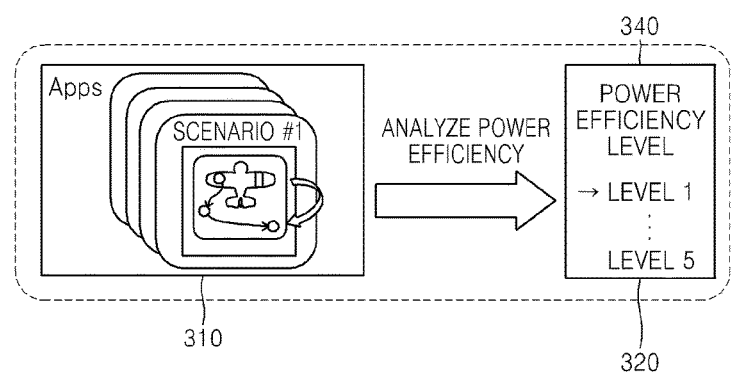
FIG. 3 is a diagram for describing a scenario for determining a power efficiency of an application, according to an exemplary embodiment.

FIG. 3 is a diagram which describes a scenario 310 for determining a power efficiency of an application, according to an exemplary embodiment.

An operation for determining power efficiency of an application may be performed by a mobile terminal. However, types of a mobile terminal for executing an application may vary, and measured power consumption of the application per unit time may vary according to a usage pattern of a user. Accordingly, the application may be executed according to the scenario 310 in order to measure or calculate standard power consumption of the application.

Referring to FIG. 3, a power efficiency determining server 340 may set at least one scenario 310 with respect to an application whose power efficiency level is to be determined. The power efficiency determining server 340 may determine power consumption based on a result of the application performing the at least one scenario 310, and then determine a power efficiency level based on the power consumption per unit time according to units of the application.

For example, the power efficiency determining server 340 may perform a random scenario for a predetermined performance time. In particular, a performance time may be set to 1 minute, 5 minutes, or 10 minutes, and various operations that may be performed in response to the application being executed, may be performed according to a random scenario. While the application performs the random scenario, the power efficiency determining server 340 may calculate power consumption per unit time according to the units of the application. In other words, the power consumption per unit time according to the units may be determined by referring to the result of performing the random scenario.

Alternatively, the power efficiency determining server 340 may perform a scenario pre-designated by a manager. For example, menus of the application may be sequentially performed once as the scenario. The power efficiency determining server 340 may induce power consumption by executing the application to perform the pre-designated scenario, and may measure the power consumption according to the units.

Alternatively, the power efficiency determining server 340 may perform a scenario based on major operations provided by an application developer. For example, the power efficiency determining server 340 may operate the application according to a scenario expected by the application developer, and may, at this time, use power consumption per unit time as a basis for determining a power efficiency level.

In response to power consumption according to the units of the application performing operations according to a scenario being measured and power consumption of the application per unit time being determined, the power consumption of the application per unit time is converted to a power efficiency level based on a level determining table. Alternatively, the power efficiency determining server 340 may repeatedly perform the scenario according to specifications of mobile terminals so as to determine a lower efficiency level according to the mobile terminals.

As such, a power efficiency level is calculated based on one scenario according to applications, and thus a reliable power efficiency level may be calculated. Such an operation of calculating a power efficiency level of an application according to a scenario is not only performed by an applications server, and may also be performed in order to determine a power efficiency level of an application installed in and executed by a mobile terminal.

Referring back to FIG. 2, the power efficiency level DB 202 may store and manage a power efficiency level of an application determined by the power efficiency determining server 240. In particular, since a power efficiency level of an application may differ according to specifications of the mobile terminal 250, the power efficiency level of the application determined according to the specifications of the mobile terminal 250 may be collected and stored.

In response to the power efficiency determining server 240 determining a power efficiency level of an application and stores the determined power efficiency level in the power efficiency level DB 202, the application transaction server 201 provides a result of registering the application and the power efficiency level stored in the power efficiency level DB 202 to the application developer 260.

Then, in response to the mobile terminal 250 requesting an application from the applications server 200, the application transaction server 201 requests a power efficiency level of the application according to models of a mobile terminal from the power efficiency level DB 202. Upon receiving the power efficiency level, the application transaction server 201 transmits an application package and the power efficiency level to the mobile terminal 250.

Application data installed in the mobile terminal 250 may include both an application package and a power efficiency level. Alternatively, the application data may only include the application package, and receive an updated power efficiency level from a server, when necessary.

Figure 4:
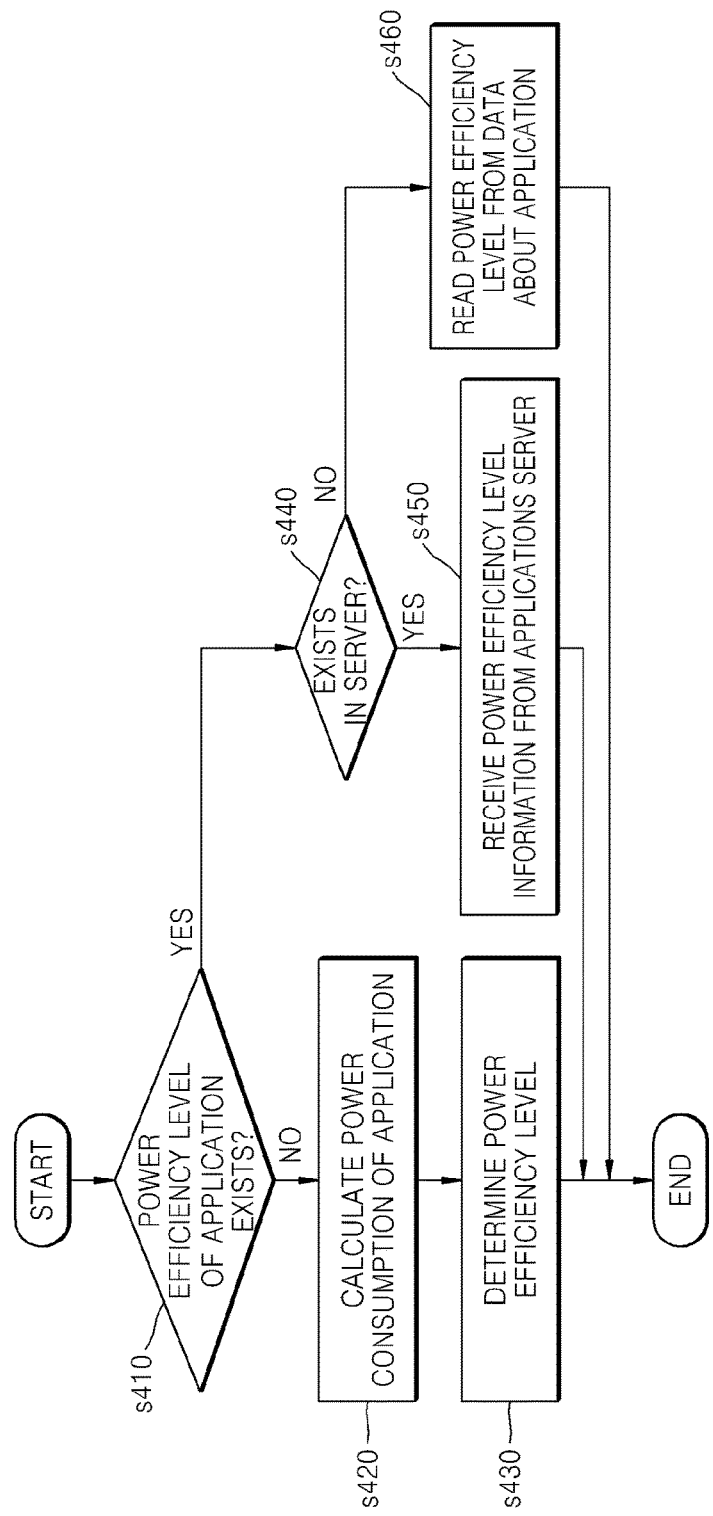
FIG. 4 is a flowchart of a method of determining a power efficiency of an application, according to another exemplary embodiment.

FIG. 4 is a flowchart of a method of determining a power efficiency of an application, according to another exemplary embodiment.

First, in operation S410, a determination is made as to whether a power efficiency level of an application exists. In particular, in response to an application being installed in the mobile terminal 250 of FIG. 2, a determination may be made as to whether information related to an intrinsic power efficiency level of the application exists. For example, a determination may be made as to whether power efficiency level determining information is included in the data of the mobile terminal 250 where the application is installed, or whether power efficiency level information which corresponds to the mobile terminal 250 exists in the applications server 200 of FIG. 2.

In response to the power efficiency level not existing, operation S420 is performed to calculate the power consumption of the application. Since operation S420 is the same as operation S111 of FIG. 1B described above, details thereof are not repeated herein.

In operation S430, a power efficiency level is determined based on the determined power consumption. In particular, a level determining table may be used to determine the power efficiency level of the application according to a range of the determined power consumption.

Otherwise, in response to a determination that the power efficiency level exists in operation S410, a determination is made as to whether the power efficiency level information exists in the applications server 200 in operation S440. In response to the power efficiency level information existing, the power efficiency level information is received from the applications server 200 in operation S450.

Otherwise, in response to a determination that the power efficiency level existing in the mobile terminal 250, instead of in the server 200 in operation S440, the power efficiency level is read from data about the application installed in the mobile terminal 250, in operation S460.

Figure 5A:
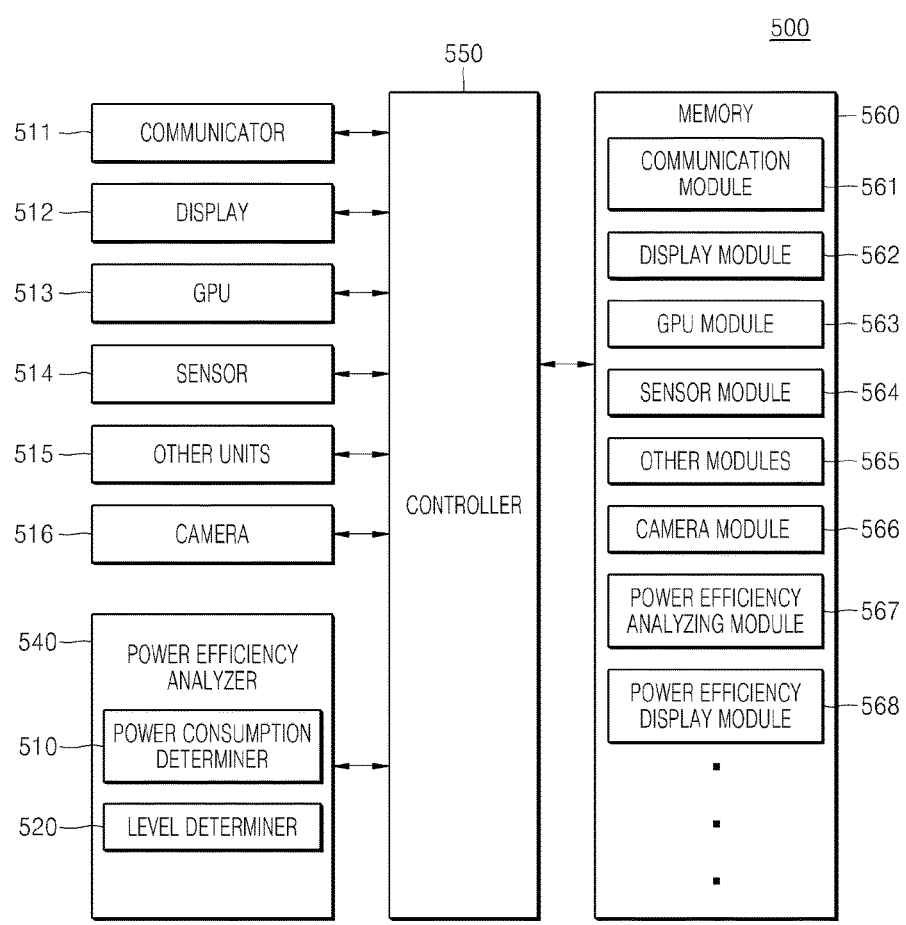
FIG. 5A is a block diagram of a mobile terminal according to another exemplary embodiment.

FIG. 5A is a block diagram of a mobile terminal 500 according to another exemplary embodiment.

The mobile terminal 500 may include a communicator 511, a display 512, a GPU 513, a sensor 514, other units 515, a camera 516, a power efficiency analyzer 540, a controller 550, and a memory 560.

The communicator 511 may perform call settings with a base station through a wireless communication network, perform a data communication, or perform a function for a local area communication, such as Bluetooth® or near-field communication (NFC).

The display 512 may include at least one of a liquid crystal display, a thin film transistor-liquid crystal display, an organic light-emitting diode display, a flexible display, a 3-dimensional (3D) display, and an electrophoretic display. In addition, the display 512 may be provided as a touch screen.

The GPU 513 is an execution processing apparatus that processes image information of a computer or outputs a screen, and may assist a graphic processing operation of a CPU.

The sensor 514 may include a plurality of pressure sensors for detecting a touch input, a geomagnetic sensor for detecting a position and motion, a gravity sensor, an acceleration sensor, a magnetic sensor, an illumination sensor for detecting the brightness of light and a temperature sensor.

The other units 515 may include apparatuses that consume power as an application is executed in the mobile terminal 500, such as a global positioning system (GPS), a microphone, a speaker, and an inter red (IR) module.

The camera 516 may include a lens and optical devices for capturing an image or a moving image.

The power efficiency analyzer 540 may include a power consumption determiner 510 and a level determiner 520. The power efficiency analyzer 540 may determine a power efficiency level of an application, and a level determining table 530 for determining a power efficiency level may be stored in the power efficiency analyzer 540. Since the method of determining a power efficiency level has been described above with reference to FIGS. 1A through 4, details thereof are not repeated herein.

The controller 550 may include a processor, such as a CPU, and may execute programs stored in the memory 560. The controller 550 may display a power efficiency level of an application determined by the power efficiency analyzer 540. Also, the controller 550 may perform a predetermined operation based on a touch input of a user or based on pressure on the touch input.

The programs stored in the memory 560 may be classified into a plurality of modules based on functions, such as a communication module 561, a display module 562, a GPU module 563, a sensor module 564, other modules 565, a power efficiency analyzing module 567, and a power efficiency display module 568. Since functions of such modules are intuitively inferable by one of ordinary skill in the art based on the unit names, only the power efficiency display module 568 will be described herein.

The power efficiency display module 568 may determine a power efficiency level of an application determined by the power efficiency analyzer 540, and display the power efficiency level on a screen of the display 512 in a predetermined form.

Figure 5B:
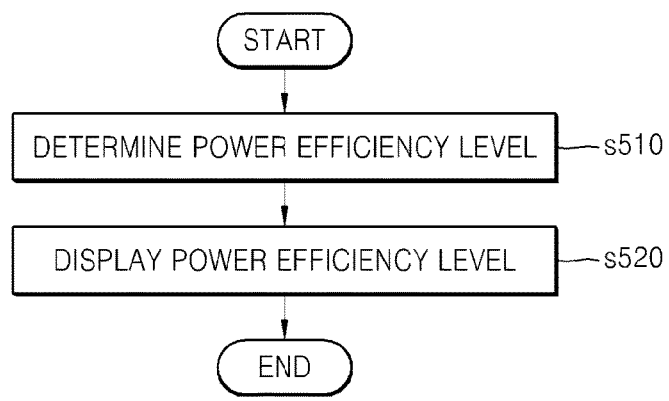
FIG. 5B is a flowchart of a method of displaying a power efficiency of an application, according to an exemplary embodiment.

FIG. 5B is a flowchart of a method of displaying a power efficiency of an application, according to an exemplary embodiment of the present invention.

In operation S510, the power efficiency analyzer 540 of the mobile terminal 500 may determine a power efficiency level by measuring power consumption per unit time of an application.

According to another exemplary embodiment, in response to the power efficiency level being pre-determined in the data of the application, as described above with reference to FIG. 4, the power efficiency level may be obtained from the data or received from an applications server.

In operation S520, the determined power efficiency level may be displayed. For example, the power efficiency level may be displayed on a screen of the mobile terminal 500, as described below with reference to FIGS. 6 through 11.

As described above, by calculating and displaying a power efficiency level of software installed in a mobile terminal, users may quantitatively determine power consumption of applications.

As such, by quantitatively displaying power efficiency levels of applications, users may install applications having high power efficiency levels and application manufacturers may manufacture applications having low power consumption.

Exemplary embodiments of displaying a power efficiency level of an application on a screen of the mobile terminal 500 will now be described with reference to FIGS. 6 through 11.

Figure 6:
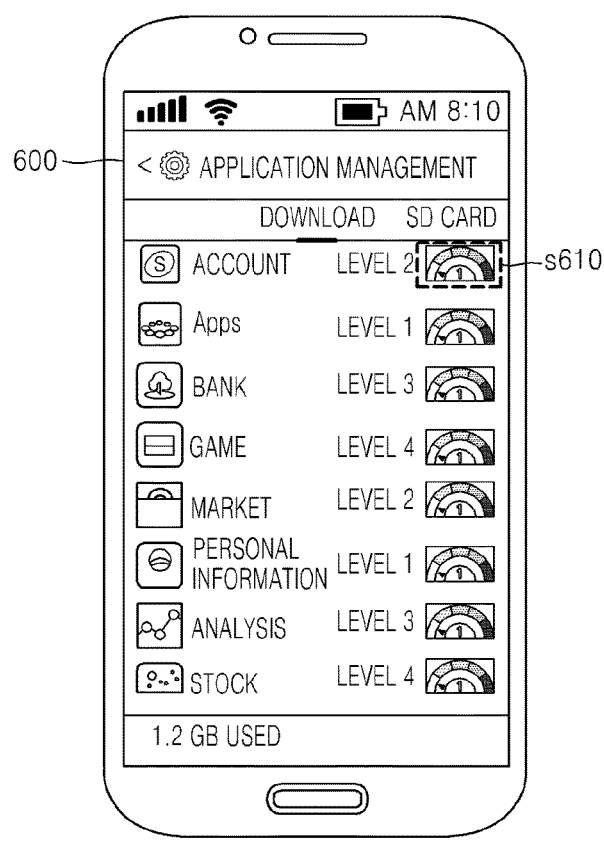
FIGS. 6 through 11 illustrate screens displaying power efficiencies of applications, according to exemplary embodiments.

FIG. 6 illustrates a screen 600 displaying power efficiencies of applications, according to an exemplary embodiment.

Referring to FIG. 6, power efficiency levels 610 of applications may be displayed on the screen 600 to display a list of applications installed in the mobile terminal 500. For example, the list may be displayed on an application management screen, and at this time, the power efficiency levels 610 may also be displayed so that a user may quantitatively determine power consumption of the application.

Figure 7:
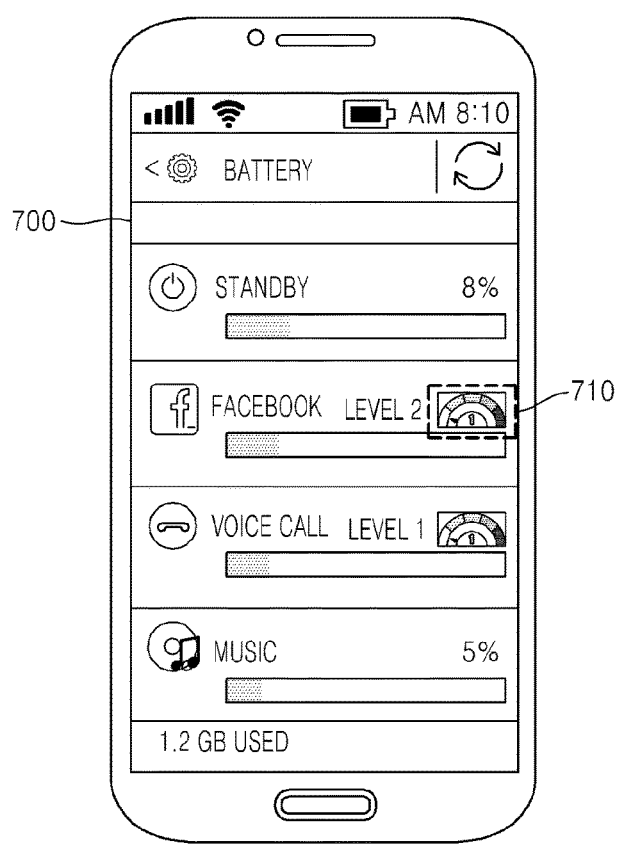

FIG. 7 illustrates a screen 700 displaying power efficiencies of applications, according to another exemplary embodiment.

Referring to FIG. 7, consumed battery amounts of applications and power efficiency levels 710 of the applications may be displayed on the screen 700 for displaying battery consumption of the mobile terminal 500. Accordingly, a user may view the proportion of power consumed by each application from the entire consumed battery amount and quantitative power consumption of each application.

Figure 8A:
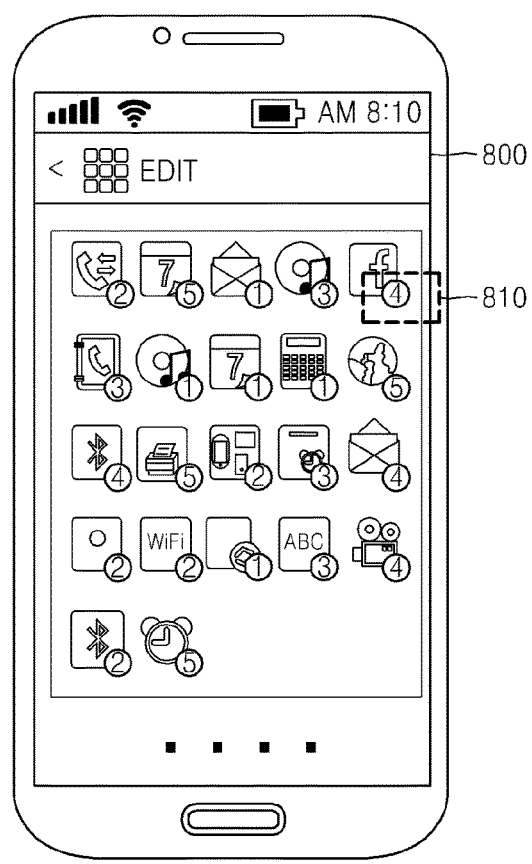
Figure 8B:
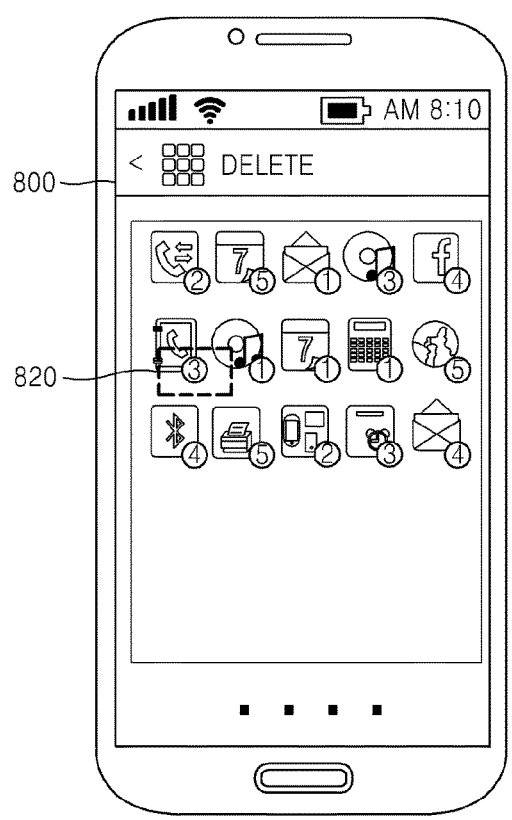

FIGS. 8A and 8B illustrate screens 800 displaying power efficiencies of applications, according to other exemplary embodiments.

Referring to FIG. 8A, power efficiency levels 810 of applications may be displayed on the screen 800 for editing applications installed in the mobile terminal 500.

For example, a plurality of applications may be displayed in icons in standby statuses on a home screen of the mobile terminal 500. In order not to interfere with the visibility of a user, the power efficiency levels 810 may not be displayed on the home screen and may only be displayed on the screen 800 for editing the home screen. In other words, the power efficiency levels 810 may be displayed while providing the screen 800 for editing the home screen, based on an input of the user. Accordingly, the user may check the power efficiency levels 810 with a satisfactory visibility, and edit locations of the icons of the applications while considering the power efficiency levels 810.

Referring to FIG. 8B, the power efficiency levels 820 may be displayed on the screen 800 to delete the applications installed in the mobile terminal 500. Accordingly, the user may consider the power efficiency levels 810 while deleting an application.

Figure 9:
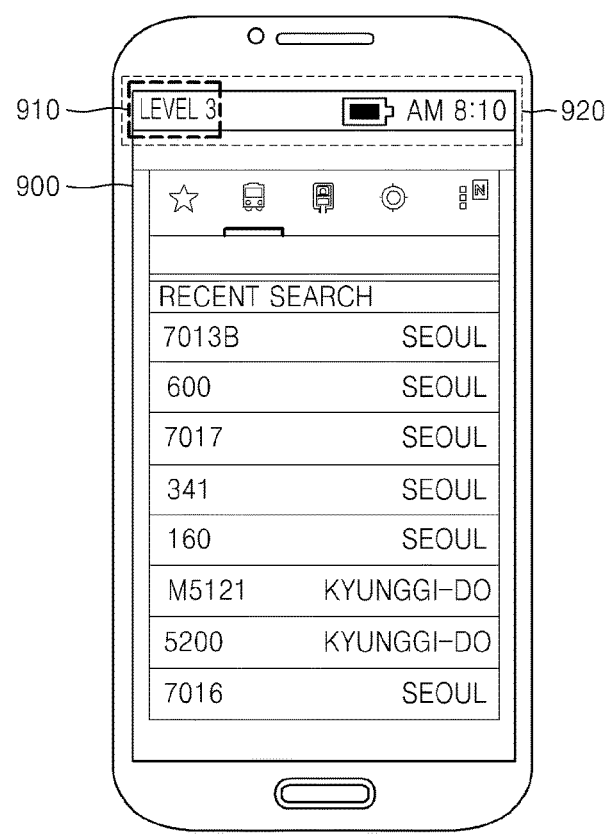

FIG. 9 illustrates a screen 900 displaying power efficiencies of applications, according to another exemplary embodiment.

Referring to FIG. 9, in response to an application being executed by the mobile terminal 500, a power efficiency level 910 of the executed application may be displayed on a state display region 920 of the screen 900. For example, the power efficiency level 910 may be displayed on one side of the state display region 920 at the top of the screen 900 in response to the application being executed by the mobile terminal 500.

The state display region 920 may be always displayed. Alternatively, the state display region 920 may be hidden during a normal operation state, and displayed on the screen 900 based on a touch input of the user touching or dragging a certain region.

Figure 10:
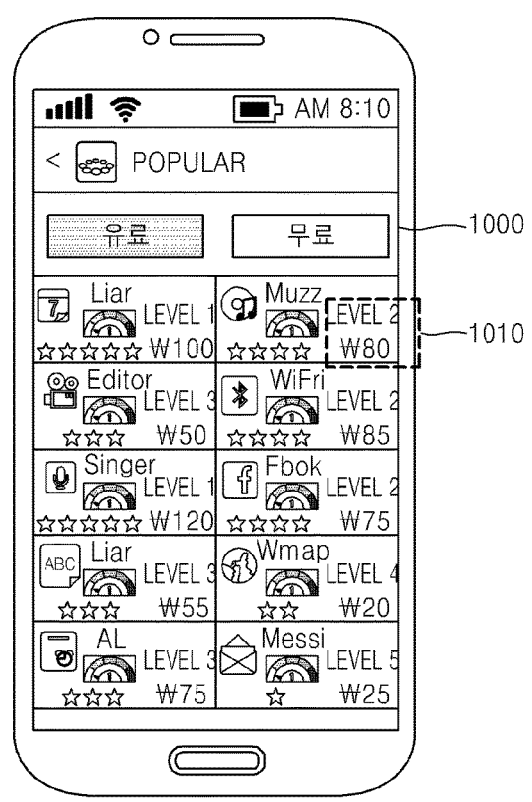

FIG. 10 illustrates a screen 1000 which displays power efficiencies of applications, according to another exemplary embodiment.

Referring to FIG. 10, power efficiency levels 1010 may be displayed on the screen 1000 for displaying a list of applications provided from the applications server 200 to the mobile terminal 250 of FIG. 2. In particular, the list may be received and displayed on the mobile terminal 250 as the mobile terminal 250 connects to the applications server 200. Here, the mobile terminal 250 may also receive and display the power efficiency levels 1010 of the applications. For example, names, icons, and the power efficiency levels 1010 of the applications may be displayed on the screen 1000 of the mobile terminal 250 that accessed an application market.

Since the power efficiency levels 1010 of the applications may differ according to the mobile terminal, the power efficiency levels 1010 displayed on the screen 1000 may differ according to specifications of the mobile terminals. For example, information related to the specifications of the mobile terminal 250 may be transmitted to the applications server 200, and the applications server 200 may provide power efficiency levels of applications according to the specifications of the mobile terminal 250.

Figure 11:
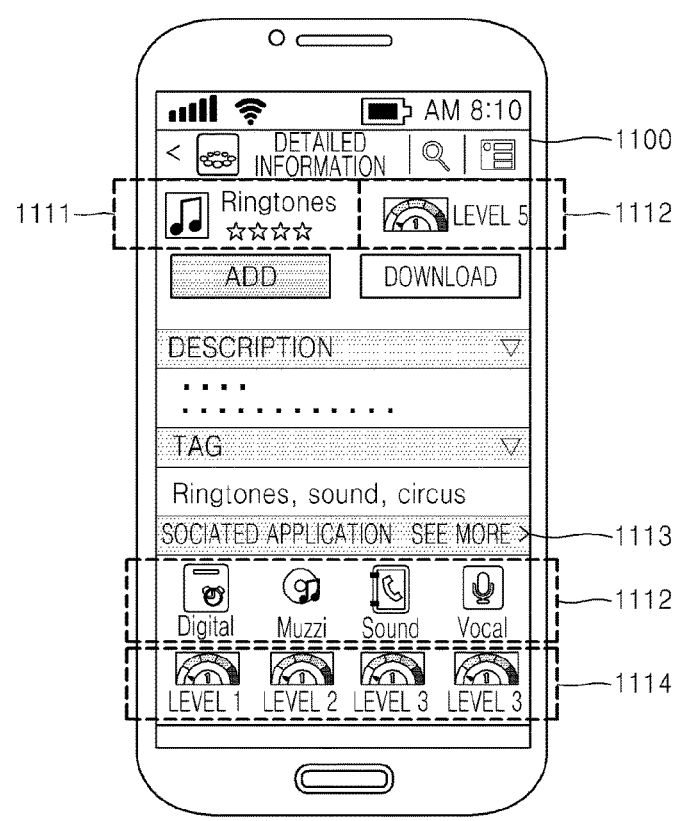

FIG. 11 illustrates a screen 1100 which displays power efficiencies of applications according to another exemplary embodiment.

Referring to FIG. 11, in response to an application being selected from the applications server 200 of FIG. 2 based on a selection by the user of the mobile terminal 250 of FIG. 2, associated applications related to the selected application and power efficiency levels related to the associated applications may be displayed on the screen 1100.

For example, in response to an application 1111 being selected from the screen 1000 of FIG. 10 based on a user input, detailed information about the application 1111 may be displayed on the screen 1100. Here, a power efficiency level 1112 of the application 1111 may also be displayed.

According to another exemplary embodiment, associated applications 1113 related to the application 1111 may be displayed on the screen 1100. Here, power efficiency levels 1114 of the associated applications 1113 may also be displayed.

According to another embodiment, the associated applications 1113 displayed on the screen 1100 may be displayed in an order of from a high power efficiency level.

In the above exemplary embodiments, power efficiency levels of applications are displayed in numbers like a gauge, but alternatively, power efficiency levels may be displayed in any form, such as characters, numbers, or icons, as long as they are recognizable. Power efficiency levels may be displayed with names or icons of applications, and may overlap each other as long as they are classified separate from each other.

Figure 12:
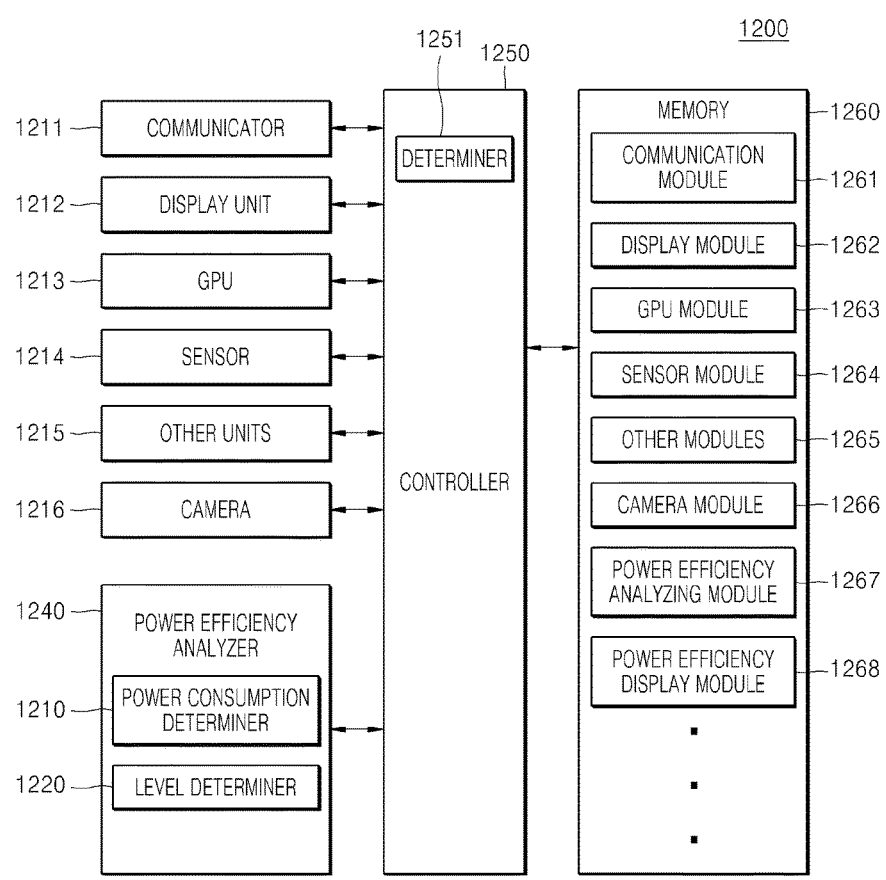
FIG. 12 is a block diagram of a mobile terminal according to another exemplary embodiment.

FIG. 12 is a block diagram of a mobile terminal 1200 according to another exemplary embodiment.

The mobile terminal 1200 may include a communicator 1211, a display 1212, a GPU 1213, a sensor 1214, other units 1215, a camera 1216, a power efficiency analyzer 1240, a controller 1250, and a memory 1260.

Since the mobile terminal 500 of FIG. 5A and the mobile terminal 1200 of FIG. 12 are similar, only differences between the mobile terminal 500 and the mobile terminal 1200 will be mainly described herein.

The controller 1250 may include a determiner 1251 to determine remaining battery life. In particular, the determiner 1251 may monitor the remaining battery life of the mobile terminal 1200 and determine whether the remaining battery life is less than or equal to a predetermined value. In response to the remaining battery life being less than or equal to the predetermined value, an operation of increasing a power efficiency of the mobile terminal 1200 may be performed.

A method of controlling power of the controller 1250 in order to increase the power efficiency of the mobile terminal 1200 will now be described with reference to FIGS. 13 through 16.

Figure 13:
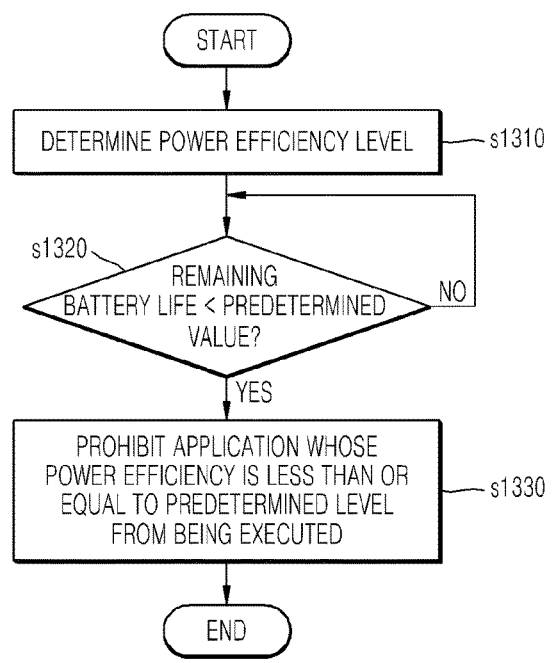
FIG. 13 is a flowchart of a method of controlling power of a mobile terminal, according to an exemplary embodiment.

FIG. 13 is a flowchart of a method of controlling power of the mobile terminal 1200, according to an exemplary embodiment.

In operation S1310, a power efficiency level of each application installed in the mobile terminal 1200 may be determined. In particular, the power efficiency level may be received by the mobile terminal 1200 from a server. Alternatively, the power efficiency analyzer 1240 of the mobile terminal 1200 may determine the power efficiency level of each application.

In operation S1320, a determination is made as to whether remaining battery life of the mobile terminal 1200 is less than or equal to a predetermined value. In response to the remaining battery life not being less than or equal to the predetermined value, a determination may be periodically made as to whether the remaining battery life is less than or equal to the predetermined value.

Otherwise, in response to the remaining battery life being less than or equal to the predetermined value, an application whose power efficiency is less than or equal to a predetermined level may be prohibited from being executed. The predetermined value of the remaining battery life may be set according to specifications of the mobile terminal 1200 or may be arbitrarily set by a user.

The application whose power efficiency is less than or equal to the predetermined level is an application having a power efficiency level equal to or higher than the predetermined level. For example, in response to power efficiency levels existing from level 1 through level 5, an application whose power efficiency is less than or equal to level 3 may be an application having a lower efficiency level of level 3, 4, or 5. Here, the power efficiency level is high in response to the number being low and vice versa.

Figure 14:
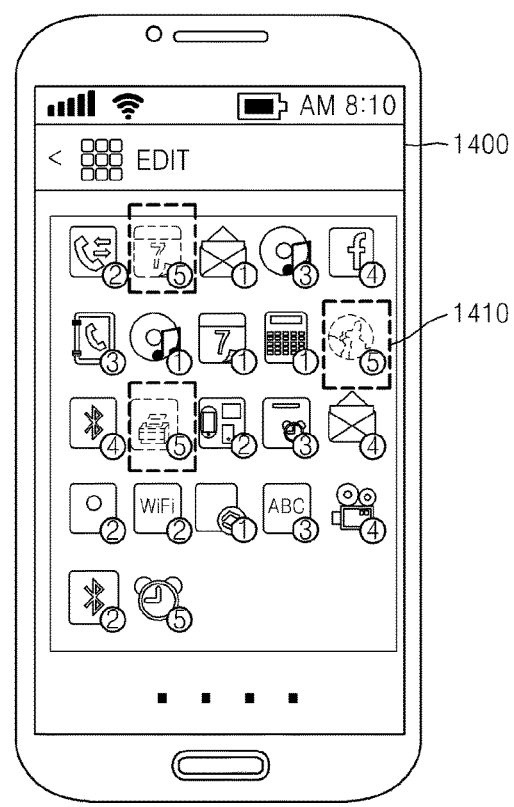
FIG. 14 illustrates a screen for describing a method of controlling power of a mobile terminal, according to an exemplary embodiment.

FIG. 14 illustrates a screen 1400 which describes a method of controlling power of the mobile terminal 1200, according to an exemplary embodiment.

Referring to FIG. 14, an application 1410 whose power efficiency level is low from among applications displayed on the screen 1400 may be prohibited from being executed in response to the remaining battery life being less than or equal to the predetermined value. In other words, an application whose power consumption is high may be prohibited from being executed to extend a holding time of a battery. Alternatively, the application 1400 whose power efficiency level is low may be displayed differently from other applications. For example, a low power efficiency level may be shown in broken lines so that the user does not select the application 1400. An application essential for a system operation or an application set by the user as an exception, may be maintained in order to be executed.

According to another exemplary embodiment, applications whose power efficiency is less than or equal to the predetermined level may be differentially prohibited from being executed, by setting ranges with respect to the remaining battery life. For example, in response to the remaining battery life being 30 percent, applications whose power efficiency levels are level 5 may be prohibited from being executed, and in response to the remaining battery life being 20 percent or 10 percent, applications whose power efficiency levels are level 4 or 3 may be prohibited from being executed.

Figure 15:
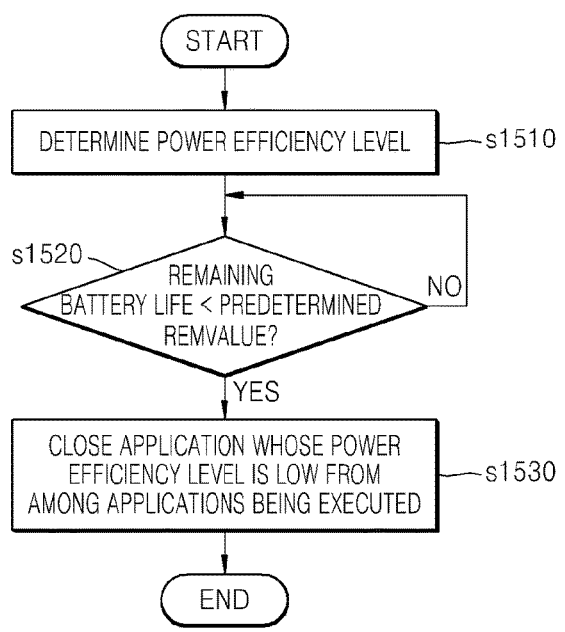
FIG. 15 is a flowchart of a method of controlling power of a mobile terminal, according to another exemplary embodiment.

FIG. 15 is a flowchart of a method of controlling power of the mobile terminal 1200, according to another exemplary embodiment.

In operation S1510, a power efficiency level of each application installed in the mobile terminal 1200 may be determined. In particular, the mobile terminal 1200 may receive the power efficiency level from a server, or the power efficiency analyzer 1240 of the mobile terminal 1200 may determine the power efficiency level according to the application.

In operation S1520, a determination is made as to whether the remaining battery life of the mobile terminal 1200 is less than or equal to the predetermined value. In response to the remaining battery life not being less than or equal to the predetermined value, a determination is periodically made as to whether the remaining battery life is less than or equal to the predetermined value.

In response to the remaining battery life being less than or equal to the predetermined value, an application whose power efficiency level is low from among applications being executed, may be forcibly terminated in operation S1530. Herein, the predetermined value of the remaining battery life may be set according to specifications of the mobile terminal 1200 or may be arbitrarily set by the user.

Figure 16:
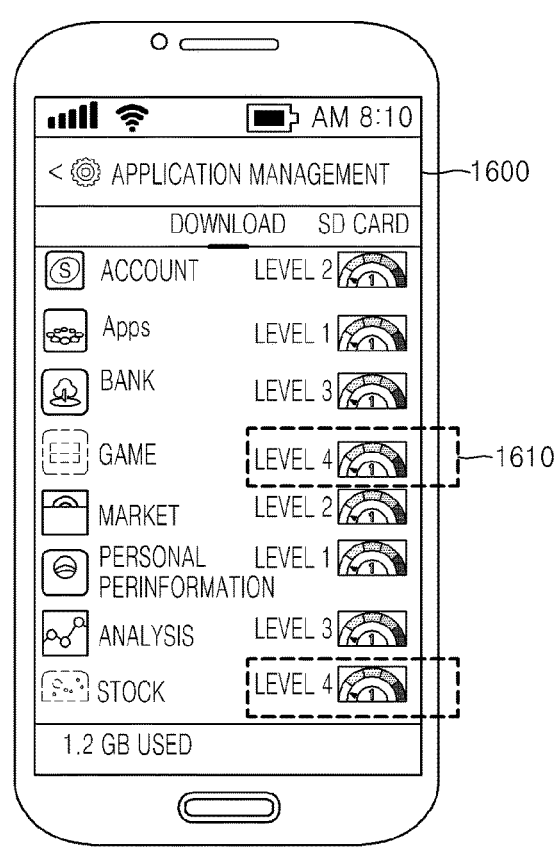
FIG. 16 illustrates a screen for describing a method of controlling power of a mobile terminal, according to another exemplary embodiment.

FIG. 16 illustrates a screen 1600 for describing a method of controlling power of the mobile terminal 1200, according to another exemplary embodiment.

Referring to FIG. 16, according to the method, applications 1610 whose power efficiencies are less than or equal to a predetermined level from a list of applications executed by the mobile terminal 1200 and displayed on the screen 1600, may be forcibly terminated, in response to the remaining battery life of the mobile terminal 1200 being less than or equal to the predetermined value. In other words, an application whose power consumption is high may be forcibly terminated in order to extend a holding time of a battery. Alternatively, the applications 1610 whose power efficiency levels are low may be displayed in broken lines so that the user forcibly terminates the applications 1610. An application essential for a system operation or an application pre-set by the user as an exception may still be executed.

According to another exemplary embodiment, in response to the remaining battery life of the mobile terminal 1200 being less than or equal to the predetermined value, the applications 1610 from the list may be forcibly terminated and information related to the forced termination of the applications 1610 may be communicated to the user.

According to another exemplary embodiment, applications whose power efficiencies are less than or equal to the predetermined level may be differentially forcibly terminated by setting ranges with respect to the remaining battery life. For example, in response to the remaining battery life being 30 percent, applications whose power efficiency levels are level 5 may be forcibly terminated, and in response to the remaining battery life being 20 or 10 percent, applications whose power efficiency levels are level 4 or 3 may be forcibly terminated.

According to another exemplary embodiment, in response to the remaining battery life of the mobile terminal 1200 being less than or equal to the predetermined value and in response to a determination that an application whose power efficiency level is lower than or equal to the predetermined level is being executed, the mobile terminal 1200 may ask the user whether to terminate the application. For example, in response to the mobile terminal 1200 determining that the application whose power efficiency level is lower than or equal to the predetermined level is being executed, the mobile terminal 1200 may display a popup window for the user to select whether or not to terminate the application. The popup window may display a selection window or icon for selecting whether to terminate the application.

According to another exemplary embodiment, in response to the remaining battery life of the mobile terminal being less than or equal to the predetermined value and in response to a determination that an application whose power efficiency level is lower than or equal to the predetermined level is being executed, only some applications selected by the user may be terminated. For example, in response to the remaining battery life being less than or equal to the predetermined value, the mobile terminal 1200 may display a list of applications whose power efficiency levels are lower than or equal to the predetermined level from among applications being executed. The mobile terminal 1200 may selectively terminate an application selected by an external input from the list.

According to another exemplary embodiment, in response to the applications whose power efficiency levels are less than or equal to the predetermined level are terminated, a termination history of the applications may be stored. Also, in response to the mobile terminal 1200 being charged such that the remaining battery life is equal to or more than the predetermined value, the terminated applications may be selectively re-executed based on the stored termination history. According to another exemplary embodiment, the mobile terminal 1200 may display a guide window for showing whether an application is re-executed. According to another exemplary embodiment, the mobile terminal 1200 may display a selection input window for the user to select whether to re-execute an application.

As described above, by prohibiting the execution of or forcibly terminating an application whose power efficiency level is low in response to the remaining battery life of the mobile terminal 1200 being low based on power efficiency levels of applications, a holding time of the battery may be extended.

The exemplary embodiments may be written as computer programs and may be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs or DVDs), etc.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments. While one or more exemplary embodiments of the present invention have been described with reference to the figures, it will be understood by those of ordinary skill in the art that various changes in form and details may be made therein without departing from the spirit and scope of the present invention as defined by the following claims.

What is claimed is:

1. A method of determining power efficiency of an application installed in a mobile terminal including a plurality of units, the method comprising:

determining whether a power efficiency level of the application exists in the mobile terminal or in an applications server;

when the power efficiency level of the application does not exist in the mobile terminal and in the applications server, determining power consumption per unit time of the application according to the plurality of units included in the mobile terminal;

determining the power efficiency level of the application based on the determined power consumption per unit time of the application and a level determining table;

determining whether a remaining battery life of the mobile terminal in which the application is installed and executed is less than or equal to a predetermined level;

prohibiting an installed and executed application whose power efficiency level is less than or equal to the predetermined level from being executed based on a result of determining the remaining battery life by terminating the installed and executed application whose power efficiency level is less than or equal to the predetermined level among a plurality of applications installed in the mobile terminal based on the result of determining the remaining battery life;

storing a termination history of the terminated installed and executed application; and re-executing the terminated installed and executed application based on the termination history in response to the remaining battery life of the mobile terminal being equal to or higher than the predetermined level, wherein the predetermined level for prohibiting an application of the plurality of applications installed in the mobile terminal is differently set for each of the plurality of applications.

2. The method of claim 1, wherein the plurality of units comprise at least one of a central processing unit (CPU), a graphics processing unit (GPU), a display, a sensor, a communicator, a camera, and other units.

3. The method of claim 1, wherein the method is performed by the mobile terminal.

4. The method of claim 3, wherein the determining of the power consumption comprises:

collecting a usage pattern of a user of the mobile terminal; and determining the power consumption per unit time of the application according to the plurality of units by referring to the collected usage pattern.

5. The method of claim 1, wherein the determining of the power consumption comprises:

determining the power consumption per unit time of the application based on a result of performing functions of the application, wherein the functions of the application are performed sequentially once.

6. The method of claim 1, further comprising reading information related to the power efficiency level from application data installed in the mobile terminal in response to determining that the power efficiency level exists in the mobile terminal.

7. The method of claim 1, further comprising displaying the determined power efficiency level of the application on the mobile terminal, wherein the determining of the power efficiency level of the application comprises determining the power consumption per unit time of each of the plurality of units used by the application in response to executing of the application and determining a power efficiency level of the application based on the determined power consumption per unit time of the application and the level determining table, wherein the displaying the power efficiency level of the application comprises displaying a plurality of applications installed in the mobile terminal and power efficiency levels of the plurality of applications on a screen of the mobile terminal.

8. The method of claim 7, wherein the displaying the power efficiency level of the application comprises displaying battery consumption of the application and the power efficiency level of the application on a battery consumption display screen of the mobile terminal.

9. The method of claim 7, wherein the displaying the power efficiency level of the application comprises displaying the power efficiency level on a screen for editing or deleting the application installed in the mobile terminal.

10. The method of claim 7, wherein the displaying the power efficiency level of the application comprises displaying the power efficiency level on a state display region in response to the application being executed by the mobile terminal.

11. The method of claim 7, wherein the displaying the power efficiency level of the application comprises displaying the power efficiency level in a list on a display screen of installed and executed applications provided by an applications server.

12. The method of claim 7, wherein the displaying the power efficiency level of the application comprises displaying an associated application related to a certain application among the plurality of applications and a power efficiency level of the associated application in response to the certain application being selected based on a user selection.

13. The method of claim 12, wherein the displaying of the associated application comprises displaying an associated installed and executed application having a high power efficiency level based on priority.

14. The method of claim 1, wherein the prohibiting comprises maintaining an installed and executed application necessary for a system operation or an installed and executed application preset by a user to be executable.

15. The method of claim 1, wherein the terminating of the installed and executed application comprises displaying a popup window requesting a user to select whether to terminate the installed and executed application whose power efficiency level is less than or equal to the predetermined level.

16. The method of claim 1,
wherein the determining of the power consumption per unit time of the application comprises determining power consumption per unit time of each of the plurality of units used by the application in response to executing of the application,
wherein the level determining table is determined based on a range of power consumption per unit time,
wherein the range is adaptively determined according to a specification of the mobile terminal, and
wherein the determining the power efficiency level of the application comprises, when the power efficiency level of the application exists in the application server, determining the power efficiency level of the application based on information related to the power efficiency level, which is received from the application server.

17. The method of claim 1,
wherein the re-executing of the terminated installed and executed application comprises:
displaying a selection input window for a user to select whether to re-execute the terminated installed and executed application; and
selectively re-executing the terminated installed and executed application.

18. A mobile terminal for determining a power efficiency of an application installed in the mobile terminal including a plurality of units, the mobile terminal comprising:
a processor configured to:
determine whether a power efficiency level of the application exists in the mobile terminal or in an applications server;
determine power consumption per unit time of the application according to the plurality of units when the power efficiency level of the application does not exist in the mobile terminal and in the applications server;
determine the power efficiency level of the application based on the determined power consumption per unit time and a level determining table,
determine whether a remaining battery life of the mobile terminal is less than or equal to a predetermined level,
prohibit an application, among a plurality of applications installed in the mobile terminal, whose power efficiency level is less than or equal to the predetermined level from being executed based on a result of the determination by terminating an installed and executed application whose power efficiency level is less than or equal to the predetermined level among a plurality of applications installed in the mobile terminal based on the result of determining the remaining battery life;
store a termination history of the terminated installed and executed application; and
re-execute the terminated installed and executed application based on the termination history in response to the remaining battery life of the mobile terminal being equal to or higher than the predetermined level,
wherein the predetermined level for prohibiting an application of the plurality of applications installed in the mobile terminal is differently set for each of the plurality of applications.

19. The mobile terminal of claim 18, wherein the processor is further configured to display the determined power efficiency level of the application on the mobile terminal.

20. The mobile terminal of claim 19, wherein the level determining table comprises a table for matching power consumption and power efficiency levels.

21. A non-transitory computer-readable recording medium having recorded thereon a program, wherein the program, when executed by a processor of a computer, causes the computer to execute the method of claim 1.

* * * * *